United States Patent
Stellacci et al.

(10) Patent No.: US 8,354,555 B2
(45) Date of Patent: Jan. 15, 2013

(54) MONOLAYER-COATED SURFACES AS CATALYTIC PLATFORMS FOR ORGANIC REACTIONS

(75) Inventors: Francesco Stellacci, Somerville, MA (US); Benjamin Wunsch, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 622 days.

(21) Appl. No.: 12/470,586

(22) Filed: May 22, 2009

(65) Prior Publication Data

US 2010/0036156 A1     Feb. 11, 2010

Related U.S. Application Data

(60) Provisional application No. 61/071,874, filed on May 22, 2008.

(51) Int. Cl.
*C07C 63/04*     (2006.01)
(52) U.S. Cl. ...................................................... 562/493
(58) Field of Classification Search ................... 562/493
See application file for complete search history.

(56) References Cited

U.S. PATENT DOCUMENTS

| | | | |
|---|---|---|---|
| 4,888,209 A * | 12/1989 | Neely | ........................... 428/433 |
| 4,921,823 A | 5/1990 | Furneaux et al. | |
| 6,255,436 B1 | 7/2001 | Kimura et al. | |
| 6,645,517 B2 | 11/2003 | West et al. | |
| 6,932,951 B1 | 8/2005 | Losey et al. | |
| 2003/0100119 A1 | 5/2003 | Weinberg et al. | |
| 2005/0090634 A1 | 4/2005 | Morse et al. | |
| 2006/0007791 A1 | 1/2006 | Bamdad | |
| 2007/0004225 A1 | 1/2007 | Lu et al. | |
| 2007/0039874 A1 | 2/2007 | Kniajanski et al. | |
| 2007/0207079 A1 | 9/2007 | Brady et al. | |
| 2007/0238010 A1 | 10/2007 | Zhang et al. | |

OTHER PUBLICATIONS

The International Search Report and the Written Opinion of the International Searching Authority. Aug. 31, 2009.

* cited by examiner

*Primary Examiner* — Jafar Parsa

(74) *Attorney, Agent, or Firm* — Mark S. Cohen; Pearl Cohen Zedek Latzer, LLP

(57) ABSTRACT

This invention provides a method for increasing the activity of catalysts. The method requires the introduction of the catalyst into nano-structured surfaces. The catalysts are introduced as functional groups in molecules forming a monolayer on a surface. A mixed monolayer of catalyst and inert molecules generates ordered domains of molecules on the surface. The catalyst is confined in regions of 0.5 nm to 3 nm in size and is surrounded by an inert material. The presence of such ordered domains that commensurate in size with the reactants, enhance the performance of the catalyst and increase the rate of the reaction.

20 Claims, 1 Drawing Sheet

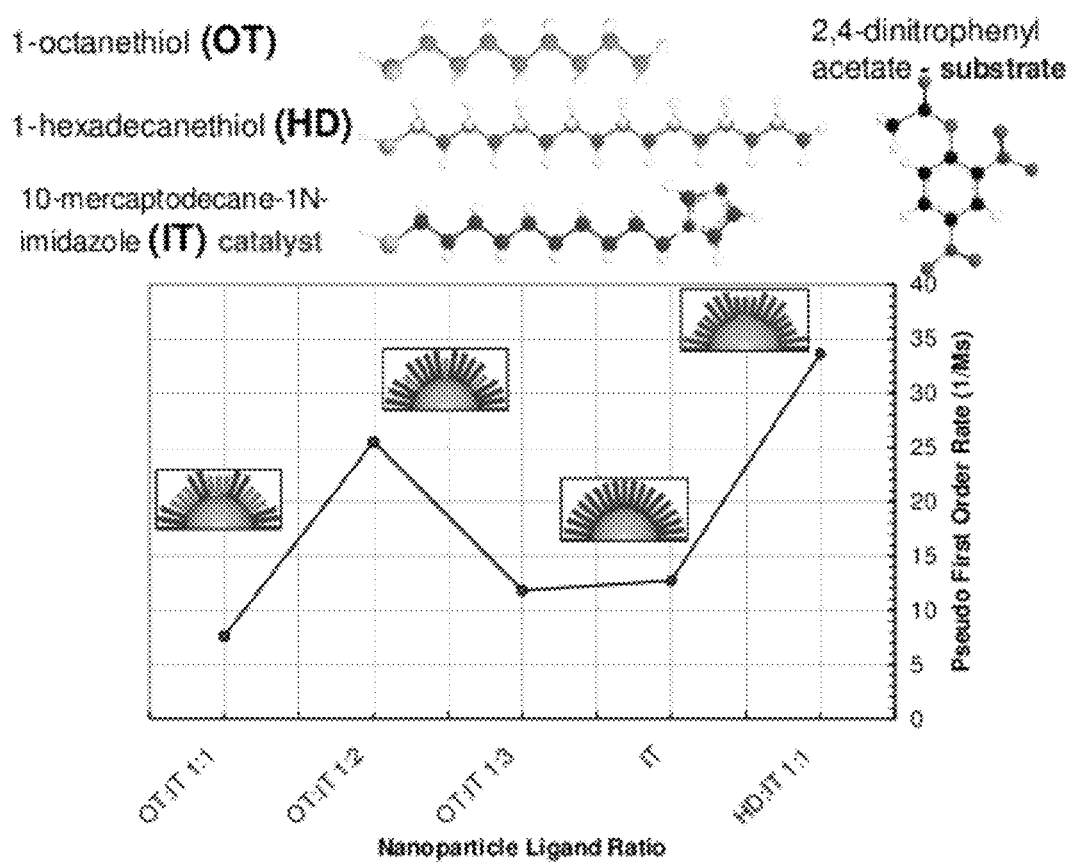

US 8,354,555 B2

MONOLAYER-COATED SURFACES AS CATALYTIC PLATFORMS FOR ORGANIC REACTIONS

CROSS-REFERENCE TO RELATED APPLICATIONS

This Application claims priority from U.S. Provisional Application Ser. No. 61/071,874, filed May 22, 2008, which is hereby incorporated in its entirety.

GOVERNMENT INTEREST STATEMENT

This invention was made with government support under grant numbers DMR-0645323, awarded by the National Science foundation. The government has certain rights in the invention.

BACKGROUND OF THE INVENTION

Catalysis is a powerful, general phenomenon that allows a reaction to proceed rapidly at a relatively low temperature. A catalyst is a substance that speeds up a reaction without being consumed itself. Catalysts for chemical reactions can be single atoms, atomic clusters, single molecules, organometallic compounds, surfaces, and biomolecules such as ribozymes and proteins. Catalysts operate by providing a lower-energy pathway for the reaction.

In order to provide a lower-energy pathway for a reaction. Successful catalysis depends on controlling the local environment of the reactants such that the molecule is shifted to a more reactive state. In practice, this usually means stressing the molecular bonds, increasing the polarization around the molecule, holding a normally high-energy state stable for a longer time, or in some cases, simply increasing the number of times that a molecule attempts to react.

One important biological catalyst is the enzyme. Enzymes are a class of protein macromolecules that increase the rate of the majority of the biochemical reactions carried out at body temperature. The catalytic activity of the enzymes is reflected in their ability to precisely position molecules and atoms in reactive arrangements.

Surfaces of solid materials are an additional class of important catalysts. Solid surfaces adsorb gaseous reactants and weaken their intramolecular bonds. Weakening the molecular bonds in the reactants, lowers the activation energy needed for the reaction, thus increasing the rate of the reaction.

In order to control the energy of a reactant, the catalyst itself must attain certain morphology. The catalyst morphology can be governed by the orientation of one molecule or by the configuration of two or more neighboring molecules. In a single molecular layer, specific orientation of a molecule with respect to neighboring molecules may be obtained. A single layer of molecules that is adsorbed on a surface is sometimes called a monolayer. Monolayer-forming molecules are usually long-chain hydrocarbon molecules terminated with reactive groups. One end of the molecule is reactive to the solid surface such that when the molecules are introduced to the surface, they bind to it and assemble into a single molecular layer.

When a monolayer is produced with two different molecules, phase segregation can occur, leading to local domains, patches or worm-like phases in the monolayer. When a monolayer is constructed on the surface of a nanoparticle, phase segregation occurs as well. Nanoparticles possess a high radius of curvature and this high curvature leads to the generation of phase segregated domains that can be less than 1 or 2 nm. Thus, molecular domains on monolayer-coated nanoparticles may have molecular scale dimensions.

Enhancing the properties of a monolayer catalyst through variations in monolayer structure, improve the catalysis of desired reactions.

SUMMARY OF THE INVENTION

This invention provides in one embodiment a method of reaction catalysis comprising:
  contacting a reactant with a surface comprising a catalyst attached thereto, wherein the catalyst is confined in regions of 0.5 nm to 3 nm in size and is surrounded by an inert material,
  wherein contacting results in catalysis of a reaction involving the reactant.

In one embodiment, the catalyst is organic. In one embodiment, the catalyst is inorganic. In one embodiment, the inert material is organic. In one embodiment, the inert material is inorganic.

In one embodiment, the organic catalyst is a portion of a larger organic molecule. In one embodiment, the organic catalyst forms self-assembled monolayers on the surface.

In one embodiment, the organic catalyst comprises thiols. In one embodiment, the thiol is 10-mercaptodecane-1N-imidazole (IT).

In one embodiment, the inert material comprises a thiol terminated molecule. In one embodiment, the thiol terminated molecule is 1-octanethiol (OT), 1-hexadecanethiol (HD), or a combination thereof.

In one embodiment, the ratio between the organic catalyst and the inert material is about HT:IT 1:1, OT:IT 1:2 or OT:IT 1:3.

In one embodiment, the surface is the surface of a nanoparticle. In one embodiment, the nanoparticle comprises metal. In one embodiment, the metal comprises gold.

In one embodiment, the confined region is ordered. In one embodiment, the ordered confined region is 1-10 molecules wide.

In one embodiment, the reactant is 2,4-dinitrophenyl acetate. In one embodiment, the reaction rate is 2-4 times faster than the rate of a reaction catalyzed by a non-confined catalyst.

In one embodiment, the reaction is a hydrolysis reaction.

In one embodiment, this invention provides a surface for catalysis of a chemical reaction comprising:
  a catalyst attached to said surface, confined in regions of space of 0.5 nm to 3 nm in size and surrounded by an inert material.

In one embodiment, this invention provides a process for preparing a surface for catalysis of a chemical reaction comprising:
  contacting a surface with a catalyst and with an inert material wherein said catalyst and said inert material are attached to said surface and wherein said catalyst forms an ordered domain having a characteristic size ranging between 0.5 nm to 3 nm on said surface.

In one embodiment, this invention provides a surface for catalysis prepared according to process of this invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1 is a demonstration of the catalytic enhancement by ordered-shell monolayer coated nanoparticles over all-catalyst (homogeneous monolayer) monolayer coated nanoparticles. The all-catalyst monolayer-coated nanoparticles (labeled IT) is seen to have a lower rate constant than either the ordered-shell OT:IT 1:2 or HD:IT 1:1 monolayer coated nanoparticles. Both of these ordered shell, mixed monolayer coated nanoparticles are in the ripple domain morphology, showing that structure in the ligand shell can help improve the catalytic activity of the catalyst.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

This invention is directed, in some embodiments, to a surface for catalysis of a chemical reaction comprising a catalyst attached to the surface, confined in regions of space of 0.5 nm to 3 nm in size and surrounded by an inert material. This invention is directed in some embodiments to processes for the production of the same. The surfaces find application in a multitude of fields and settings, and represent, in some embodiments, an important element in catalysis, in separation and purification techniques, in chemical detection, in microfuidics, in the development of new diagnostics/imaging methods and in therapeutics such as drug delivery. In other embodiments the surfaces of this invention find use as fillers or coaters, where, inter alia, surfaces enhance the optical, mechanical or electronic properties of the material.

Catalysis, which in one embodiment, relies upon inducing a specific spatial organization of a reactant or a substrate molecule with respect to the catalyst, depend largely on the structure and orientation of the catalyst. In this invention, the confinement of the catalyst to a 0.5 nm-3 nm region and the presence of an inert material surrounding the catalyst, results in the formation of a preferred catalyst orientation that enhances the ability of the reactant or the substrate to undergo reaction.

To control the local, molecular environment around a molecule or surface is not trivial. However, there are several model systems which have been demonstrated to offer control of this morphology. One such system is a monolayer. A monolayer is a single layer of molecules assembled on a surface. Usually the molecules are fat-like hydrocarbon chains terminated with reactive molecules. One end is selected so that it is reactive to a surface and when the molecules are introduced to the surface, they assemble into a single layer. It was demonstrated that when a monolayer is produced with two different molecules, phase segregation can occur, leading to local domains, patches or worm-like phases in the monolayer. Patches or regions in the monolayer can have a characteristic size of less than 5 nm. It was further demonstrated that when a nanoscale metal (a nanoparticle) was coated with a mixed, two-molecule monolayer, phase segregation occurred. Nanoparticles usually possess a high radius of curvature. This high curvature leads to the generation of phase segregated domains that can be on the order of less than 1-2 nm.

The unique ordering of the monolayer on a surface of a material or on the surface of a nanoparticle offers the type of local environmental that can affect the catalytic properties of functional groups within the monolayer.

The small size of the segregated domains can be of the order of single molecules. The ability to change the type of molecules in the monolayer allows to position different combinations of molecular groups in close proximity. If one of the molecules is chosen to have a known catalytic group on its end, then surfaces of materials or of nanoparticles can be made with small, ~1-2 nm wide, domains charged with a catalytic group. By changing the second, inert molecule, the local environment of the catalytic group can be chosen to be polar or non-polar, or hydrophobic or hydrophilic. Choice of the molecule can determine if the catalytic functional group stands above the surface of the monolayer or is buried within it. Furthermore, by changing the size, curvature or morphology of the surface of the material or the particle or changing the ratio of the two molecules comprising the monolayer, the catalysis domain size and geometry may be shifted.

In one embodiment, this invention demonstrates that when gold core nanoparticles are synthesized with a combination of an inert hydrocarbon (e.g. octanethiol (OT)) and an organic catalyst—11-mercapto-undecane-1N-imidazole (IT) in various ratios (from 0% to 100% catalyst IT) it is possible to modulate the reactivity of the catalyst in the hydrolysis of an ester, 2,4-dinitrophenyl acetate. In one embodiment, in an OT-IT type coated particle, the catalyst IT may extend its imidazole group above the particle surface. If OT is replaced with hexadecanethiol (HD) in which the IT may be buried in the shell of the nanoparticle, an enhancement of the reactivity above either pure IT or and OT-IT mix is shown. These results demonstrate that changing the local environment of the catalyst through the ordered domains of the particle improves the catalytic activity of the catalyst. By changing the molecular structure that surrounds the catalyst, the effect of the catalyst can be modified.

In one embodiment, this concept can be extended to any system where local, molecular-scale ordering can be affected. In practice, self-assembling systems, in which a variety of nanoscale molecular arrangements can be achieved, offer a great potential for economic value, technological ease and customizability in catalytic reactions.

Surfaces comprising mixed monolayers can be flat surfaces, curved surfaces, smooth or rough surfaces, surfaces of particles, inner surfaces of porous materials, etched surfaces, lithographically patterned surfaces, natural surfaces, synthetic surfaces, surfaces of particles, spheres, beads, clusters etc.

In one embodiment, the nanoscale ordered domains used for catalysis may comprise monolayers, multilayers, block polymers and colloids.

In one embodiment, methods of this invention have the additional advantage of reducing the complexity seen in other types of catalysts. In one embodiment, this invention provides a method of use of ordered-shell surfaces to modulate and enhance catalysis reactions. In one embodiment, methods of this invention, offer new, facile and efficient catalytic systems for the synthesis of current and novel materials.

I. Surfaces, Nanoparticles and Clusters of this Invention

In one embodiment, this invention provides a surface for catalysis of a chemical reaction comprising:

a catalyst attached to said surface, confined in regions of space of 0.5 nm to 3 nm in size and surrounded by an inert material.

In one embodiment, the phrase "confined in regions of space of 0.5 nm to 3 nm in size" means that the molecules comprising the catalyst span an area having at least one dimension between 0.5 nm and 3 nm on a surface. In one embodiment, the catalyst molecules can be confined to patches, areas, regions, lines, wherein at least one dimension defining the area or line ranges between 0.5 nm and 3 nm. In one embodiment, the regions on the surface comprising the catalyst are surrounded by non-catalyst or inert molecules. In one embodiment, the area that one stretched thiol molecule occupy is 0.5 nm×0.5 nm. In one embodiment this area is approximately 0.25 $nm^2$. In one embodiment, if a square array of 4×4 molecules is present on the surface, the area span of the molecules is 2×2=4 $nm^2$ (four nanometers squared). In one embodiment, a catalyst molecule, when held stretched in a monolayers occupy a surface area ranging between 0.3 nm and 1.5 nm. In one embodiment, the region on the surface coated by the catalyst molecules has the shape of a line, a square, a rectangle, a hexagon, star shape, or an irregular shape. In one embodiment, single catalyst molecules can be embedded in an area coated by inert molecules. In one embodiment, "regions of space" means an area on a surface. In one embodiment, the catalyst molecules form a line with a width ranging between 0.5 nm and 1.2 nm and a length ranging between 5 nm and 50 nm on a surface.

In one embodiment, the catalyst is organic. In one embodiment, the catalyst is inorganic. In one embodiment, the inert material is organic. In one embodiment, the inert material is inorganic.

In one embodiment, the organic catalyst is a portion of a larger organic molecule. In one embodiment, the organic catalyst forms self-assembled monolayers on the surface.

In one embodiment, the organic catalyst comprises thiols. In one embodiment, the thiol is 10-mercaptodecane-1N-imidazole (IT).

In one embodiment, the inert material comprises a thiol-terminated molecule. In one embodiment, the thiol-terminated molecule is 1-octanethiol (OT), 1-hexadecanethiol (HD), or a combination thereof.

In one embodiment, a thiol is a group comprising of a sulfur and a hydrogen. In one embodiment, a thiol group is an —S—H group. In one embodiment a thiol group is chemically bonded to other chemical or functional groups. In one embodiment, a thiol is an end group or an exposed group in a molecule. In one embodiment, thiol group when bonded to the surface of a material may loose the hydrogen. In one embodiment, the sulfur atom of a thiol group bonds or is associated with a surface.

In one embodiment, disulfides or dithiols can replace thiols in methods of the invention.

In one embodiment the ratio between the organic catalyst and the inert material is about HT:IT 1:1, OT:IT 1:2 or OT:IT 1:3.

In one embodiment, the ratio between any organic catalyst and any inert material ranges between 1:1 and 2:1, or between 2:1 and 3:1, or between 2:1 and 4:1 or between 5:1 and 10:1. In one embodiment, the ratio between any organic catalyst and any inert material ranges between 1:1 and 1:2 or between 1:1 and 1:3 or between 1:1 and 1:5.

In one embodiment, the ratio between the catalyst and the inert material represent their molar ratio in solution prior to assembly on the surface. In one embodiment, the ratio between the catalyst and the inert material represent their molecular ratio on the surface. In one embodiment, the ratio between the catalyst and the inert material in the solution from which they are adsorbed onto the surface is different from their ratio on the surface. In another embodiment, ratio between the catalyst and the inert material in such solution is equal or similar or approximately the same as their ratio on the surface. In one embodiment, the catalyst molecules coats between 10% and 20% of the surface while the inert material coats the rest of the coated regions on the surface. In one embodiment, the catalyst molecules coats between 10% and 20% of the surface while the inert material coats the rest of the the rest of the coated regions on the surface. In one embodiment, the catalyst molecules coats between 0.1% and 10% of the surface while the inert material coats the rest of the rest of the coated regions on the surface. In one embodiment, the catalyst molecules coats between 20% and 50% of the surface while the inert material coats the rest of the coated regions of the surface.

In one embodiment, the surface is the surface of a nanoparticle. In one embodiment, the nanoparticle comprises metal. In one embodiment, the metal comprises gold.

In one embodiment, the confined region is ordered. In one embodiment, the ordered confined region is 1-10 molecules wide.

In one embodiment, the reaction is a hydrolysis reaction.

In one embodiment, the surface is a surface of a material. In one embodiment, the surface is the outermost layer of atoms or molecules of a certain material. In on embodiment, the surface is the interface between a material and the surroundings. In one embodiment, the surface is smooth. In one embodiment, the surface is rough. In on embodiment, the surface is patterned. In one embodiment, the surface has pattern periodicity. In one embodiment, regions in the surface have high curvature. In one embodiment, regions on the surface have a radius of curvature ranging between 1 nm and 10 nm. In one embodiment, the unit nm represent nanometer or nanometers.

In one embodiment, the radius of curvature for a given curved surface is defined by the radius of a circle that is tangent to the curve. Such circle is called an osculating circle. The osculating circle of a sufficiently smooth plane curve at a given point on the curve is the circle whose center lies on the inner normal line and whose curvature is the same as that of the given curve at that point. The radius of this circle, which is the one among all tangent circles at the given point that approaches the curve most tightly, is called the radius of curvature. In one embodiment this definition is extended to three dimensions. In one embodiment, the radius of curvature of a surface equals the radius of a tangent ball whose curvature is the same as that of the given surface over some area.

In one embodiment, different planes of the surface have different radii of curvature.

In one embodiment, the surface is a surface of a nanoparticle. In one embodiment, the nanoparticle is a particle with at least one dimension in the nanoscale. In one embodiment, a nanoparticle has at least one axis, one dimension, a length, a width, a height, a thickness, a diameter or a combination thereof ranging between 1 nanometer and 1000 nanometers.

In one embodiment, the surface or the material comprising the surface or the nanoparticle or the cluster comprises metal. In one embodiment, the metal is gold. In one embodiment, the metal is platinum, palladium, or tungsten. In one embodiment, the metal is copper or silver. In one embodiment the material, the surface, the particle or cluster contains mercury. In one embodiment, the metal is aluminum. In one embodiment, the material, the surface, the particle or cluster comprises metal alloy. In one embodiment, the material from which the particle or surface is made is a gold/palladium alloy. In one embodiment, the material from which the surface or the particle or the cluster is made is a salt, an oxide, a hydroxide, or any other non metallic compound containing at least two different atoms. In one embodiment the material contained in the nanoparticle or the cluster or the surface comprises CdSe, CdTe, CdS, $Al_2O_3$ or $SiO_2$. In one embodiment, the surface, the nanoparticle or the cluster is made of in whole or in part from an electrically conducting material. In one embodiment, the surface or the nanoparticle or cluster is made of in whole or in part from an electrically semiconducting material, In one embodiment, the surface or the nanoparticle or the cluster is made of in whole or in part from an electrically insulating material, In one embodiment, the surface or the nanoparticle or the cluster is made of in whole or in part from a superconducting material. In one embodiment, the surface or the nanoparticle or cluster is made of in whole or in part from $YBa_2Cu_3O_7$. In one embodiment, the surface or the nanoparticle or the cluster comprises glass or a glassy material. In one embodiment, the surface or the nanoparticle or the cluster comprises quartz, pyrex, or glass containing any metal ions. In one embodiment, the surface or the nanoparticle or cluster comprises silicon. In one embodiment, the surface or the nanoparticle or the cluster comprises alumina or silica. In one embodiment, the surface or the nanoparticle or the cluster comprises aluminum coated by aluminum oxide or silicon coated by silicon oxide. In one embodiment, the surface or the nanoparticle/cluster comprising an amorphous material. In one embodiment, the surface or the nanoparticle or the cluster comprising a crystalline or a semicrystalline material. In one embodiment, the surfaces or the nanoparticles comprising different domains with different crystal structures. In one embodiment, the surface or the nanoparticle or the cluster comprising organic material. In one embodiment the organic material is a polymeric material. In one embodiment, the polymeric material comprises polystyrene or PMMA.

In one embodiment, surfaces and nanoparticles of this invention have a layered structure. In one embodiment, materials comprising surfaces of this invention or nanoparticles of this invention have a core-shell structure. In one embodiment, a core-shell structure is a structure in which the core of the particle comprises one material and the shell of the particle comprises a different material. In one embodiment, the core of the particle is made of a combination of materials or elements, and the shell is made of a different combination of materials or elements. In one embodiment, the shell material coats the core material. In one embodiment coating is full. In one embodiment, coating is partial. In one embodiment, the shell material is the material that is present on the surface of the particle or of the material. In one embodiment the material comprising the surface of the particle or the surface of a heterogeneous material is the material that may be involved in chemical reactions of the particle or of the surface with other materials or molecules. In one embodiment, the surface material dictates the material or the particle reactivity. In one embodiment, the surface material dictates the particle solubility. In one embodiment, the surface material dictates the material wettability. In one embodiment the core of the particle or the inner layer of a material is a dielectric material and the shell or the outer layer of the material is metallic. In one embodiment, the core of the particle or the inner layer of a material is metallic and the shell or outer layer is a dielectric or semiconducting material. In one embodiment, the core of the particle or the inner layer of a material is metallic, semimetallic or semiconducting and the shell or outer layer is insulating. In one embodiment, both the core or the inner layer of a material and the shell or outer layer are metallic. In one embodiment, both the core or the inner layer and the shell or the outer layer are semiconducting. In one embodiment, both the core or the inner layer and the shell or the outer layer are electrically insulating.

In one embodiment, in a core-shell particle, or in a layered material, the radius of the particle, or the thickness of the material is approximately the radius of the core (or thickness of the inner layer) plus the thickness of the shell (or thickness of the outer layer). In one embodiment, the radius of the core (or thickness of the inner layer) and the thickness of the shell (or thickness of the outer layer) are similar. In one embodiment, the radius/thickness of the core/inner layer is approximately 5% of the particle radius/material thickness. In one embodiment, the radius/thickness of the core/inner layer is approximately 10% of the particle radius/material thickness. In one embodiment, the radius/thickness of the core/inner layer is approximately 25% of the particle radius/material thickness. In one embodiment, the radius/thickness of the core/inner layer is 50% approximately of the particle radius/material thickness. In one embodiment, the radius/thickness of the core/inner layer is approximately 75% of the particle radius/material thickness. In one embodiment, the radius/thickness of the core/inner layer is approximately 90% of the particle radius/material thickness. In one embodiment, the radius/thickness of the core/inner layer is approximately 95% of the particle radius/material thickness. In one embodiment, the radius/thickness of the core/inner layer is approximately 99% of the particle radius/material thickness. In one embodiment, the radius/thickness of the core/inner layer is 99.9% of the total particle radius/material thickness.

In one embodiment, the term shell refers to the material of which the surface of the particle is made before the self-assembled monolayer is applied. In one embodiment, the shell is the monolayer. In one embodiment, the particle can have a core-shell structure as described herein above, and on top of the shell, an additional monolayer shell is constructed. Such coated particles comprises one core and two shells. The outermost monolayer shell contains the catalyst in one embodiment.

In one embodiment, the surface of a material or the surface of a particle is rough. In one embodiment, the surface is smooth. In one embodiment, the surface possesses various degrees of roughness. In one embodiment, roughness is a measure of the topography of the surface. In one embodiment, roughness is a measure of the texture of a surface. In one embodiment, roughness is a measure of the distance between the lowest and highest points of the surface. In one embodiment, highest and lowest points refer to relative distances from the center of the particle or from a theoretical reference line or a theoretical flat surface drawn underneath the lowest point of the surface.

In one embodiment, this invention is directed to surfaces of particles. In one embodiment, the particle is spherical. In one embodiment, the particle has a rod-like shape. In one embodiment, the particle is oval, square, rectangular, tear-drop shaped, cylindrical, cone-shaped, helical, or posses an hexagonal feature. In one embodiment, the particle is symmetric, and in another embodiment, asymmetric. In one embodiment, the particle has high symmetry, and in another embodiment, low symmetry. In one embodiment, the particle has no regular shape. In one embodiment, one or more regions on the surface of the particle are rounded while other one or more regions on the surface of the particle are sharp, flat, rough, pointed, cone-shaped or helix-shaped. In one embodiment, all particle characteristics described herein above may apply to curved or other non-flat regions on surfaces of bulk materials, and to a curved or other non-flat regions on macroscopically large surfaces. In one embodiment, particles described herein may be adsorbed or bonded to surfaces that are much larger than the particles.

In one embodiment confined regions on the surfaces or nanoparticles of this invention have a characteristic length, or a diameter or a long axis dimension ranging from between 1 nm-100 nm. In one embodiment the nanoparticles have a diameter or a long axis dimension ranging from between 1-5 nm. In one embodiment the nanoparticles have a diameter or a long axis dimension ranging from between 2-6 nm. In one embodiment the nanoparticles have a diameter or a long axis dimension ranging from between 4-6 nm. In one embodiment the nanoparticles have a diameter or a long axis dimension ranging from between 1-10 nm. In one embodiment the nanoparticles have a diameter or a long axis dimension ranging from between 10-50 nm. In one embodiment the nanoparticles have a diameter or a long axis dimension ranging from between 50-150 nm. In one embodiment the nanoparticles have a diameter or a long axis dimension ranging from between 100-1000 nm. In one embodiment the nanoparticles have a diameter or a long axis dimension ranging from between 5-15 nm. In one embodiment the nanoparticles have a diameter or a long axis dimension ranging from between 100-300 nm. In one embodiment the nanoparticles have a diameter or a long axis dimension ranging from between 300-500 nm. In one embodiment the nanoparticles have a diameter or a long axis dimension ranging from between 500-700 nm. In one embodiment the nanoparticles have a diameter or a long axis dimension ranging from between 0.1-1 nm. In one embodiment the nanoparticles have a diameter or a long axis dimension ranging from between 0.5-1.5 nm.

In one embodiment the nanoparticles form clusters. In one embodiment, "cluster" is an aggregate of particles. In one embodiment, a "cluster" is an assembly of particles. In one embodiment, a "cluster" is a structure containing a few particles. In one embodiment, the particles in a cluster are held by attractive forces between the particles. In one embodiment, forces between particles cause the surfaces of particles to be held close together. In one embodiment, attractive forces between particles in a cluster cause the merging of two particle surfaces. In one embodiment the clusters contain 2-10 nanoparticles. In one embodiment the clusters contain 2-5 nanoparticles. In one embodiment the clusters contain 5-10 nanoparticles. In one embodiment the clusters contain 10-20 nanoparticles. In one embodiment the clusters contain 20-30 nanoparticles. In one embodiment the clusters contain 30-50 nanoparticles. In one embodiment the clusters contain 10-100 nanoparticles. In one embodiment the clusters contain 100-500 nanoparticles. In one embodiment the clusters contain 1000-10,000 nanoparticles.

In one embodiment, clusters contain particles of the same size and geometry. In one embodiment, clusters contain particles of different size and/or of different geometry. In one embodiment, clusters contain particles with a small size distribution. In one embodiment, clusters contain particles with a large size distribution. In one embodiment, the size distribution of particles in a cluster is +/−1 nm from the particles average size. In one embodiment, the size distribution of particles in a cluster is +/−2 nm from the particles average size. In one embodiment, the size distribution of particles in a cluster is +/−3 nm from the particles average size. In one embodiment, the size distribution of particles in a cluster is +/−4 nm from the particles average size. In one embodiment, the size distribution of particles in a cluster is +/−5 nm from the particles average size. In one embodiment, the size distribution of particles in a cluster is +/−10 nm from the particles average size. In one embodiment, the size distribution of particles in a cluster is +/−50 nm from the particles average size.

In one embodiment, cluster dimensions reflect the number of particles from which the cluster is made. In one embodiment, cluster dimensions can be calculated or can be estimated from the number of particles in the cluster and from the dimensions of the particles in the cluster. For example and in one embodiment, a cluster of 13 spherical particles arranged in a closed packed cluster may have their largest dimension equal to the diameter of three particles. If for example the particle diameter is 2 nm, the cluster longest axis will be approximately 2 nm×3=6 nm. Such cluster can be referred to as a "6 nm cluster". In one embodiment, the particle sizes, particle geometries, and the number of particles in a cluster given above, can be used to calculate the dimensions of clusters of the present invention.

In one embodiment, clusters comprise an ordered array of particles. In one embodiment, clusters comprising a disordered array of particles. In one embodiment, clusters comprising particles with no order. In one embodiment, clusters comprising domains of ordered particles and domains of disordered particles. In one embodiment, particles are arranged in the cluster to give various cluster geometries. In one embodiment, cluster geometry is spherical or close to spherical. In one embodiment, cluster geometry represents a chain of particles. In one embodiment, cluster geometry can be any geometry imposed by the configuration of the particles from which the cluster is made.

In another embodiment, a "cluster" is a cluster of single atoms and not a cluster of particles containing more than one atom. According to this aspect and in one embodiment, a cluster is synonymous to a particle. According to this aspect and in one embodiment, a cluster of atoms is a very small particle. In one embodiment, a cluster of atoms contains 13 atoms. In one embodiment, a cluster of atoms contain 55 atoms. In one embodiment the longest dimension of the cluster is less than 10 Å. In one embodiment, the longest axis of the cluster comprises 1-5 atoms. In one embodiment, the longest axis of the cluster comprises 5-10 atoms. In one embodiment, the longest axis of the cluster comprises 10-20 atoms. In one embodiment, the size of a cluster of atoms is in the sub-nanometer range.

In one embodiment, a cluster is an aggregate, a collection of, or an assembly of atoms, particles or molecules.

In one embodiment, surfaces or nanoparticles of this invention comprise a coating which comprises an organic molecule with at least one functional end group.

In one embodiment, the molecule coating the surface or the particle is termed a "ligand". In one embodiment, a "ligand" is synonymous with a "molecule". In one embodiment, the term ligand is used because the molecules are bonded around the particle. In one embodiment, the molecules are ligating the surface or the particle. In one embodiment, the term "ligand" is borrowed form coordination chemistry in which a ligand is a molecule coordinated to a metal ion. In coordination chemistry, a ligand is a molecule or an ion having a lone electron pair that can be used to form a bond to a metal ion. In the coated nanoparticle field, the nanoparticle may represent the metal ion, and the molecule coating the nanoparticle may be called a "ligand" in analogy to coordination chemistry. This terminology is known to a person skilled in the art.

In one embodiment the functional end group of the molecule coating the surface or the particle is a thiol group. In one embodiment, a thiol group is a group comprising a sulfur atom bound to a hydrogen atom. In one embodiment, a thiol group is denoted by —SH. In one embodiment the functional end group is a carboxylic acid group. In one embodiment the functional end group is an amine group. In one embodiment, the functional end group serves as the anchor of a rod-like organic molecule to the surface or to the particle. Once an anchor is made between the functional end group and the surface or the nanoparticles, neighboring organic molecules that have similar rod-like structure are self-assembled with their long axis perpendicular or with a certain tilt angle with respect to the surface of the material or with respect to the particle surface. The long axis of one molecule is assembled parallel to the long axis of a neighboring molecule. Two molecules are held stretched in this way due to the van der Waals forces between the long "tails" of the molecules. Such arrangement forms a packed mono-molecular layer on the surface of the material or the particle. In one embodiment, "mono-molecular layer" is synonymous with the term "monolayer". In one embodiment a monolayer is a single layer of organic molecules arranged on the material surface or the particle surface. In one embodiment the long tail of the molecule or a portion of it is hydrophobic. In one embodiment the long tail comprising a hydrocarbon chain. In one embodiment, the hydrocarbon is an alkane. In one embodiment, the alkane is made of a chain of single-bonded carbon atoms, wherein each carbon atom is bonded to hydrogen atoms as well. In one embodiment, such monolayer is referred to as "self assembled" monolayer. In one embodiment "self assembled" means that the monolayer is formed spontaneously. In one embodiment, "self assembled" means that under the right conditions, molecules will approach the particle surface, or any other material surface, will anchor to it, and will stretch their tails by interacting with neighboring anchoring molecules, forming an ordered layer. In one embodiment, "self-assembly" means that the ordered or partially-ordered assembly of molecules was formed without further intervention. In one embodiment, self-assembly of molecules on the surfaces or on the nanoparticles means a spontaneous bonding of molecules to, attraction of molecules to, adsorption of molecules on, association of molecules with, precipitation of molecules on the surfaces/nanoparticles of this invention.

In one embodiment, the coating or self-assembly process results in surfaces/nanoparticles having a coating comprising between 60%-98% of their surface area. In one embodiment, the surfaces/nanoparticles organic-monolayer coating comprising 98%-100% of the particle's surface area. In one embodiment, the surfaces/nanoparticles organic-monolayer coating comprising 98%-99% of the surface/particle surface area. In one embodiment, the surfaces/nanoparticles organic-monolayer coating comprising 95%-99% of the surface/particle surface area. In one embodiment, the surfaces/nanoparticles organic-monolayer coating comprising 98%-99.9% of the surface/particle surface area. In one embodiment, the surfaces/nanoparticles organic-monolayer coating comprising 85%-95% of the surface/particle surface area. In one embodiment, the surface/nanoparticles organic-monolayer coating comprising 75%-90% of the surface/particle surface area. In one embodiment, the surfaces/nanoparticles organic-monolayer coating comprising 40%-60% of the surface/particle surface area. In one embodiment, the process results in surfaces/nanoparticles having a coating comprising between 10%-40% of their surface area.

In one embodiment, an additional functional group is present on the self-assembled molecules. The additional functional group is located at the molecule end that is exposed to the environment. In one embodiment, this additional functional group is used for chemical reactions. In one embodiment, this additional functional group is used for catalysis. In one embodiment this additional functional group is used for linking other molecules to the surface/particle. In one embodiment this additional functional group is used for linking or for attracting a substrate. In one embodiment, this additional group is an imidazole. In one embodiment this additional functional group is a carboxylic acid, an amine, a biotin, hydroxyl, ethylene glycol, an unsaturated hydrocarbon, or a phenyl. In one embodiment, the additional functional group contains a halogen atom. In one embodiment, the additional functional group contains a metal or a metal ion. In some embodiments the functional group resembles the polar end group of natural and synthetic lipids. In one embodiment, the additional functional group comprises a porphyrin, hydroxamate, catechol, EDTA, or other organic and biological ligands or chelating groups. In some embodiments the additional functional groups can be bound to a protein or a DNA molecule. In one embodiment, the additional group comprises an enzyme or a ribozyme. In one embodiment, the additional functional group comprises an enzyme mimetic molecule. In one embodiment the additional exposed functional group can bind the surface or the nanoparticles to a cell receptor or to a cell membrane. In one embodiment the additional functional group form links between two surfaces/nanoparticles. In one embodiment the additional functional group or the molecule bound to it represent a targeting moiety, for use in in vivo applications. In one embodiment the targeting moiety bound through the surface-exposed additional functional groups is used for tissue targeting. In one embodiment the targeting moiety binds to receptors on cells. In one embodiment the targeting moiety adheres to cell membranes. In one embodiment a cleavable moiety is bounded through the functional group. In one embodiment cleavable moiety is used for controlled drug release. In one embodiment the functional group or the molecule bound to it is a fluorescent marker. In one embodiment the functional group or the molecule bound to it are used for immunoassays. In one embodiment, engineering of the additional functional groups on the organic molecule renders the coated surface/particle compatible with various environmental conditions. In one embodiment, choice of the functional group that is exposed to the environment, results in the desired miscibility of the coated surface/particle in aqueous or organic solvent. In one embodiment, choice of the functional group that is exposed to the environment, results in the desired permeation ability of the coated surface/particle through cell membranes or filters. In one embodiment, choice of the functional group that is exposed to the environment, results in the desired chemical reactivity of the coated surface/particle. In one embodiment, choice of the functional group that is exposed to the environment, results in the desired catalytic activity of the coated surface/particle. In one embodiment, choice of the functional group that is exposed to the environment, results in the desired stability of the coated surface/particle.

In one embodiment, the functional group is only partially exposed or not exposed until certain conditions such as pH, temperature, ionic concentration, or chemical environment cause the functional group to be exposed to the external environment of the particle.

In one embodiment, the functional group is berried or hidden between longer backbones of surrounding inert molecules. In one embodiment, the functional group is the last group in the backbone of the catalyst molecule. In another embodiment, the functional group is somewhere in between the two ends of the catalyst molecule.

In one embodiment, a catalyst molecule possesses an anchor group to the surface (of e.g. a particle), a spacer or a linker and a functional group that is responsible for catalysis. In one embodiment, the term catalyst is referring to the whole molaecule with the three parts. In another embodiment, the term catalyst refers to the functional group only.

In one embodiment, the catalyst part of the molecule comprises an inorganic group such as a metal ion, a metal cluster. In one embodiment, the catalyst comprises an organo-metallic moiety.

In one embodiment a multilayer of bi-functional molecules is constructed on the surface/particles of this invention. In one embodiment a multilayer structure of bifunctional molecules increases the size of the particle shell or of the surface outer layers.

In one embodiment a multilayer of bifunctional molecules links two surfaces/particles while keeping a distance between the surfaces/particles. In one embodiment constructing multilayers of bifunctional molecules on surfaces/particles and linking molecules of different surfaces/particles creates a complex organic-nanoparticle structure or a complex structure involving organic coated surfaces. In one embodiment this structure has improved mechanical properties. In one embodiment this structure is porous. In one embodiment this structure is water permeable. In one embodiment, this structure is solvent permeable. In one embodiment, the term "water permeable" or "solvent permeable" refers to pores in the structure creating a continuous pathway for water/solvent molecules to permeate or penetrate throughout the structure. In one embodiment, water molecules entering one end of the structure can flow through the structure and exit through another end. In one embodiment, water molecules can carry a chemical or a mixture of chemicals or one or more solutes that will be transformed through the nanoparticles complex structure or the surface-containing structure. In one embodiment this structure can be used for catalysis. In one embodiment, this structure can be one phase and a solution or a gas stream containing the reactant or the substrate can be the a second phase. In one embodiment, such complex structure provide the necessary number of catalytic sites for a catalyzed reaction. In one embodiment, such structure posses the desired mechanical and physical properties for carrying out a catalytical reaction. In one embodiment such structure is robust and stable. In one embodiment this structure can be used as a filter or a membrane, where various chemicals have different affinity to the surface/particle organic coating or the organic linkers, and at least one component of a solution is retained in the structure for a longer period than another component such as a chemical or solvent. In one embodiment instead of water, an organic solution can flow through the structure. In one embodiment the organic molecules coating the surfaces/particles or linking between them are modified to retain at least one molecule of interest thus separating it from a mixture. In one embodiment the organic molecules are modified to become more hydrophilic. In one embodiment the organic molecules are modified to become more hydrophobic. In one embodiment the structure pores are modified to optimally retain gas phase molecules. In one embodiment the nanoparticles complex or surface containing complex structure is further dissolved in an acid, thus enables the collection and purification of the retained molecule of interest that was trapped in the structure. In one embodiment the surfaces/nanoparticles filter or membrane is part of a separation device. In one embodiment, in such device, at the end of the surface/nanoparticles complex holder, a collection vial or tool is connected to collect the molecules and solvent that had passed through the structure. In one embodiment collection is performed as a function of time to collect different species with different retention times. In one embodiment, the filter containing the surfaces of this invention or the nanoparticles separation filter of this invention and the collection module are parts in an automated system or a robot. In one embodiment an imaging or analyzing system is connected to the separation device comprising the surfaces/nanoparticles of this invention. In one embodiment, the components of the separation device described herein above can be utilized in a reaction catalysis system comprising the complex organic-nanoparticle structure, or comprising a complex structure containing surfaces of this invention.

In one embodiment the complex organic-nanoparticle structure or the complex organics-on-surfaces structure of this invention may find application as a filler or a coating for paper, plastics, inorganic or metallic substrates. In one embodiment mixing the complex nanoparticles-organic structure or the surface-containing structure with a paper, polymeric or a metal substrate enhances the mechanical properties of the substrate.

In some embodiments, surfaces/nanoparticles of this invention comprise a coating which comprises two or more functional end groups, or in some embodiments, two or more organic molecules. According to this aspect of the invention and in one embodiment, one of the organic molecules is a hydrophilic molecule and one organic molecule is a hydrophobic molecule. In one embodiment two or more organic molecules are hydrophobic. In one embodiment, the molecular coating comprises 1-hexadecanethiol (HD) or 1-octanethiol (OT) molecules, and 10-mercaptodecane-1N-imidazole (IT) molecules. In one embodiment at least one organic molecule contains a saturated or an unsaturated alkyl chain. In one embodiment at least one organic molecule contains an aromatic group. In one embodiment the molecule chain is straight. In one embodiment the molecule is branched. In one embodiment there are inter-molecular forces holding at least two organic molecules forming the surface/particle coating. In one embodiment the intermolecular forces between coating molecules are van-der-Waals forces. In one embodiment the intermolecular forces are polar bonds. In one embodiment the intermolecular forces are hydrogen bonds. In one embodiment at least two molecules comprising the coating are covalently-bonded.

It is to be understood that any number of desirable compounds may be incorporated within or on the surfaces, nanoparticles and clusters of this invention, and the chemistry to incorporate such molecules is well known, and is a function of the material being incorporated therein.

In one embodiment the at least two organic molecules forming a particle-coating on nanoparticles and clusters of this invention results in a decrease in the size distribution of the coated nanoparticles. In one embodiment, incorporation of at least one organic molecule in the particle coating influences the particle geometry. In one embodiment the selection of one or more organic molecules for the coating renders the particles more spherical in shape. In one embodiment the energetics of bond formation and bond breakage between the organic molecules, the nanoparticles and the solvent may induce changes in geometry and size of the particles. In one embodiment bond formation and bond breaking causes nanoparticle surface atoms rearrangement, resulting in a unique particle size or particle geometry or particle surface roughness or a combination thereof. In one embodiment, such changes in the characteristics of the nanoparticles are applicable to curved, protruded, elevated and patterned domains on other surfaces of this invention.

In one embodiment, the formation of a molecular layer on the surface of the particle arrests the growth of the particle. In one embodiment, the process of particle growth is carried on in conjunction to the process of coating the particle with the organic molecules. In one embodiment, as more and more organic molecules coat the particle, growth of the particle is inhibited. The growth of particle clusters which involves aggregation of growing particles is inhibited by molecular-layer formation on the particles. The organic molecules that coat the particles form a barrier for the attachment of two particles in one embodiment.

In another embodiment, the process of monolayer formation on the particle or on the cluster is done after the particle has stopped growing, or after the cluster has completely formed.

In one embodiment, the process of forming the particles and clusters is done in solution. In one embodiment, a solution containing a positive metal ion is brought under conditions in which the metal ion is reduced to the metal atom. In one embodiment, the solution contains a reduction agent. In one embodiment, metal atoms join together to form a particle. In one embodiment, addition of metal atoms to the particle increases the size of the particle. In one embodiment, when growing particles get in contact with one another, they can bind to one another. In one embodiment, this process results in clusters or aggregates of particles. In one embodiment, clusters of particles grow by the addition of particles to the cluster. In one embodiment clusters may grow as a result of the growth of individual particles within the cluster. In one embodiment, the addition of organic molecules to the solution causes binding of the organic molecules to the surface of the particles. In one embodiment, the organic molecules self-assemble on the particle surface. In one embodiment, when the organic molecules assemble on the surface, they create a barrier between the particle surface-atoms and atoms or ions in solution. In one embodiment, monolayer formation thus prevents further growth of the particle, because atoms from solution do not have access to the particle surface.

In one embodiment, the time in which the organic molecules are introduced to the growing particle solution is used to control particle and cluster size. In one embodiment, if the organic molecules are added to the solution after a short time, particle sizes are smaller. In one embodiment, if organic molecules are added to the solution after longer time periods, particle sizes may be larger.

In one embodiment, nanoparticle synthesis is carried out using an aqueous solution of a gold salt. In one embodiment, the gold salt is $HAuCl_4 \cdot 3H_2O$. In one embodiment, the gold ions are transferred to an organic solution using a phase-transfer agent. In one embodiment, the phase-transfer agent is tetraoctylammonium bromide. In one embodiment, the nanoparticle coating molecules are introduced to the organic solution containing the gold ion. In one embodiment the coating molecules are thiolated molecules. In one embodiment, following the addition of the organic molecules, a reducing agent is added. In one embodiment, the reducing agent is $NaBH_4$. In one embodiment the organic and the aqueous phases are separated, and the organic phase is concentrated and diluted again with ethanol. In one embodiment, the solution is refrigerated overnight to allow the coated nanoparticles to precipitate. In one embodiment, the solution is filtered and rinsed with water and with organic solvents.

In one embodiment a portion of the coating molecules have a hydrophobic terminus that is surface exposed after monolayer formation. In one embodiment the majority of surface exposed hydrophobic groups, makes the particles soluble in an organic solvent. In one embodiment salvation in organic solvent enables the extraction of the particles from the aqueous phase into the organic phase. In one embodiment a portion of the organic coating molecules have a hydrophilic end group exposed to the surface after monolayer formation. In one embodiment the hydrophilic molecules may modify or control the total solubility of the particles. In one embodiment, some hydrophilic end groups exposed to the surface enables better solubility of the particles in less hydrophobic organic solvents. In one embodiment, the ratio of hydrophobic to hydrophilic exposed groups on the molecules forming the particle coating, fine-tunes the solubility of the molecules in a certain organic solvent. In one embodiment, if the majority of the exposed end-groups are hydrophilic, or if some of the exposed end-groups are highly hydrophilic, the particle may be soluble in aqueous solutions or in water. In one embodiment, when hydrophobicity/hydrophilicity issues described herein above are addressed to large surfaces instead of to particles, such modifications will modify the wettability of the surfaces by polar/non polar solvents, and will affect the accessibility of the surfaces to species from organic/aqueous solutions, according to the solubility considerations described herein above.

In one embodiment a portion of the molecules possess a reactive end group exposed to the environment. In one embodiment, the reactive end-group is utilized as precursors for linking additional molecules to the coating. In one embodiment isolated functional groups are used to bind a linker molecule that can link to other surfaces/particles. In one embodiment a number of functional groups on the surface of the coating are used to bind a reactant, a substrate, a biological marker, an antigen, a protein, a DNA, a fluorescent probe, or a drug.

In one embodiment covalent bonding between at least two organic molecules forming the coating occurs before or during the adsorption of the molecules to the surface or on the particle. In one embodiment the covalent bonding between two coating molecules occurs after the molecules are attached to the surfaces/particles. In one embodiment bonding between molecules is induced using chemicals in solution. In one embodiment bonding is induced using a light source or by other means of photochemistry. In one embodiment bonding is induced by physical changes. In one embodiment bonding is induced by changes of pH, temperature, solvent or concentrations of species in solution. In one embodiment bonding between coating molecules is induced by means of electrochemistry.

In one embodiment bonding between neighboring organic molecules coating the surface or the particle yields a polymer coating the surface or the particle. In one embodiment polymerization of organic molecules coating the surface or the particles is radical polymerization. In one embodiment ethene groups on adjacent organic molecules polymerize to give a polyethene layer surrounding the particle or coating the surface. In one embodiment polymerization of coating molecules makes the nanoparticle or the surface robust.

In one embodiment the surface or the particle is patterned by an organic molecule coating. In one embodiment at least two organic molecules coating the surface of the particle form domains on the particle surface. In one embodiment patterning can be controlled. In one embodiment controlled patterning depends on the curvature of the particle, or the topography of the surface. In one embodiment the curvature of the spherical particle or the topography of the surface and the choice of the two molecules, forms ordered domains or rows of the at least two molecules on the surface. In one embodiment controlled patterning imparts special chemical properties to the surface or to the particle. In one embodiment, the at least two organic molecules coating the particle results in a ripple structure.

In one embodiment, when at least two molecules coat the surface or the particle and form domains or rows or ripples on the surface or on the particle, the reactivity of the molecules is affected. In one embodiment, when at least two molecules coat the surface or the particle and form a structure in which a single or a few molecules of one type are surrounded by molecules of a second type, the reactivity of the molecules is affected.

In one embodiment, reactivity of the molecules is affected because the exposed reactive end group of a self-assembled molecule has greater accessibility to substrates or other molecules approaching it from solution. In one embodiment, when similar molecules are closely-packed on a surface, there exist strong bonds between their end groups, which prevent further bonding with substrates from solution.

In one embodiment, two molecules form the coating of the surface. In one embodiment, one molecule posses a reactive exposed end group and the other molecule does not. In one embodiment, one molecule has an exposed imidazole group and the other ends with a $CH_3$ group. In one embodiment the imidazole group is reactive and can participate in hydrolysis reactions. In one embodiment, hydrolysis is a reaction in which a molecule of water is added to a substrate. In one embodiment, adding a water molecule to a substrate results in the formation of two new molecules from the substrate. In one embodiment, the imidazole group functions as a catalyst in this hydrolysis reaction. In one embodiment, a catalyst is a molecule or a material that is not consumed or produced during the reaction. In one embodiment, a catalyst is a molecule or a material that increase the reaction rate of a reaction. In one embodiment, a catalyst is a molecule or a material that reduces the energy barrier for a reaction. In one embodiment, a catalyst is a molecule or a material that reduces the activation energy for a reaction. In one embodiment, a catalyst enables more reactants collisions to end with the formation of reaction products.

In one embodiment, when the imidazole-containing molecule or a group of imidazole-containing molecules are surrounded by a $CH_3$-ended molecules, the reactivity of the imidazole group toward substrates in solution is increased. In one embodiment, increased reactivity or increased catalytic activity is the result of the unique conformation of the imidazole end-group. In one embodiment, increased reactivity or increased catalytic activity is the result of the configuration of the imidazole molecule and the surrounding alkane groups. In one embodiment, increased reactivity or increased catalytic activity is the result of the spacings between the imidazole end groups. In one embodiment, increased reactivity or increased catalytic activity is the result of the spacings between the imidazole end group and the end groups of neighboring molecules. In one embodiment, increased reactivity or increased catalytic activity is the result of better solubility of the coated particle in the reaction solution, or on the polarity of the coated surface. In one embodiment, increased reactivity or increased catalytic activity is the result of solvent effects. In one embodiment, increased reactivity or increased catalytic activity is the result of a denser monolayer. In one embodiment, increased reactivity or increased catalytic activity is the result of an increase in the number of accessible reactive molecules on the surface. In one embodiment, increased reactivity or increased catalytic activity is the result of having the alkane chain molecules holding the imidazole-end group molecules exposed. In one embodiment, increased reactivity or increased catalytic activity is the result of the long alkane chain molecules holding the imidazole-end group molecules partially-shielded. In one embodiment, increased reactivity or increased catalytic activity is the result of having the reactant or the substrate attracted by one monolayer-forming molecules, and catalyzed by another monolayer-forming molecule.

In one embodiment, when the simple thiol molecules are longer than the imidazole-bearing molecule, they form a dense, closely-packed monolayer in which imidazole-bearing molecules are incorporated in such a way that their imidazole groups are better exposed. In one embodiment, this can be the result of various tilt-angles of groups of molecules, or the result of a channel leading to the imidazole group, or because some imidazole molecules do not bind to the surface, and are held within a group of alkane-thiol molecules in a way that keeps their imidazole exposed. This can be the result of preferred hydrophobic interactions between the tails of the molecules and unpreferred interactions between the hydrophobic tails of the alkane-thiols and the imidazole end-group.

In some embodiments, any effect of configuration, conformation, orientation, projection, geometry or shape of the reactive molecule and its neighboring molecules on the surface results in an increased reactivity or catalytic activity of the reactive molecule or functional group. In some embodiments, any effect of a chemical change, a lateral change, a structural change, a functional change or a change in local concentration, of the reactive molecule and its neighboring molecules on the surface results in an increased reactivity or catalytic activity of the reactive molecule or functional group. In some embodiments, the energetic state of the reactive molecule with respect to its neighboring molecules on the surface results in an increased reactivity or catalytic activity of the reactive molecule or functional group.

In one embodiment, the at least two organic molecules form ordered domains of molecules on the surface. In one embodiment, "ordered domains" do not refer to the domain areas (which might be highly amorphous and traverse torturously around the shell or outer layer of the surface) but instead to the size and perimeter of the domains, which have well defined widths and heights, respectively. These properties may constitute ordering on the nanoscale. In another embodiment, ordered domains do refer to domain areas. In one embodiment, ordered domains refer to domains in which all the molecules are arranged with the same tilt angle with respect to the surface. In one embodiment, ordered domains refer to domains in which the molecules have periodical spacings between them. In one embodiment, ordered domains refer to a series of rows of ordered molecules. In one embodiment, ordered domains refers to a crystal-like structure of the molecules within the domain. In one embodiment, ordered domains contain molecules of the same type. In one embodiment, ordered domains contain molecules of at least two types. In one embodiment, ordered domains can be elongated, in the form of a chain or can be in the form of patches. In one embodiment, the curvature of the surfaces or of the nanoparticle dictates the domain size and morphology. In one embodiment, ordered domains can be of any size, shape and geometry that is physically possible on the surface.

In some embodiments the domains of the at least two organic molecules on the surface can be imaged or manipulated. In some embodiments the organic molecule domains can be imaged or manipulated using an atomic force microscope (AFM). In one embodiment the organic molecule domains can be imaged or manipulated using a scanning tunneling microscope (STM). In one embodiment, domains can be imaged by transmission electron microscope (TEM) or using a scanning electron microscope (SEM).

In one embodiment, the monolayer coating has high density. In one embodiment, the coating has low density. In one embodiment coating comprises pores, making the surface accessible to interaction with solvent, solution, reactants, substrates or chemicals in solution. In one embodiment coating comprises pores, making the reactive groups accessible to interaction with gas molecules.

In one embodiment, an "inert" material is a material that does not interact with species or chemicals. In one embodiment, inert means non-reactive. In one embodiment, inert means that the material lacks the catalytic activity of the catalyst of this invention. In one embodiment, inert means a non-catalytic material. In one embodiment, the inert material does assist in catalysis but in a way that is different from that of the catalyst of this invention. In one embodiment, inert means lacking the catalytic functional group of the catalytic molecule or species.

In one embodiment, the confined regions are surrounded by inert material. In one embodiment, at least one dimension of the confined region is ranging between 0.5 nm and 3 nm. In one embodiment, at least one dimension of the confined region is ranging between 0.5 nm and 1 nm. In one embodiment, at least one dimension of the confined region is ranging between 1 nm and 2 nm. In one embodiment, at least one dimension of the confined region is ranging between 2 nm and 3 nm. In one embodiment, at least one dimension of the confined region is ranging between 0.1 nm and 0.5 nm. In one embodiment, at least one dimension of the confined region is ranging between 0.1 nm and 1 nm. In one embodiment, at least one dimension of the confined region is ranging between 0.2 nm and 0.8 nm. In one embodiment, at least one dimension of the confined region is ranging between 1 nm and 5 nm. In one embodiment, at least one dimension of the confined region is ranging between 3 nm and 10 nm. In one embodiment, at least one dimension of the confined region is ranging between 5 nm and 50 nm.

In one embodiment, this invention provides a material comprising an article having a surface, at least a portion of the surface having a local radius of curvature of about 1000 nm or less, and a monolayer coating on the portion, wherein the monolayer comprises a plurality of ligands organized into ordered domains having a characteristic size of less than or about equal to ten nanometers.

In one embodiment, a plurality of ligands means at least two ligands.

II. Processes to Prepare Surfaces, Nanoparticles and Clusters of this Invention

In one embodiment, this invention provides a process for preparing a surface for catalysis of a chemical reaction comprising:
  contacting a surface with a catalyst and with an inert material wherein said catalyst and
  said inert material are attached to said surface and wherein said catalyst forms an ordered
  domain having a characteristic size ranging between 0.5 nm to 3 nm on said surface.

In one embodiment, the catalyst is organic. In one embodiment, the catalyst is inorganic. In one embodiment, the inert material is organic. In one embodiment, the inert material is inorganic.

In one embodiment, the organic catalyst is a portion of a larger organic molecule. In one embodiment, the organic catalyst forms self-assembled monolayers on the surface.

In one embodiment, the organic catalyst comprises thiols. In one embodiment, the thiol is 10-mercaptodecane-1N-imidazole (IT).

In one embodiment, the inert material comprises a thiol-terminated molecule. In one embodiment, the thiol-terminated molecule is 1-octanethiol (OT), 1-hexadecanethiol (HD), or a combination thereof.

In one embodiment the ratio between the organic catalyst and the inert material is about HT:IT 1:1, OT:IT 1:2 or OT:IT 1:3.

In one embodiment, the surface is the surface of a nanoparticle. In one embodiment, the surface comprises metal. In one embodiment, the surface comprises gold.

In one embodiment, the confined region is ordered. In one embodiment, the ordered confined region is 1-10 molecules wide.

In one embodiment, the reaction is a hydrolysis reaction. In one embodiment the processes of this invention can be controlled such that a desirable distribution of nanoparticle size may be obtained. In one embodiment, such control of the processes of this invention, according to this aspect, may be a reflection of the choice of organic molecule used for particle coating and the choice of the point in time when the organic molecules are introduced to the growing-particles solution.

In one embodiment, organic molecules can be present in a solution before the particles start growing in the solution. In one embodiment, organic molecules can be added to a solution after particle growth has started. In one embodiment, organic molecules can be added to a solution after particle growth was completed.

In one embodiment, two or more organic molecules may comprise the coating of the nanoparticles as herein described. According to this aspect, and in one embodiment, such choice may influence the particle size, particle geometry and other particle characteristics, for example, the surface roughness, solubility and reactivity of the particles.

In another embodiment, all aspects of the processes of this invention may influence surface characteristics or cluster characteristics, or nanoparticle characteristics. For example, and in one embodiment, interaction between the functional end group of the organic molecule and the surface may influence the coating thickness, uniformity, overall size of a coated particle, etc., as well as the porosity of the surface or other physical characteristics, such as wettability, charge, stress, etc.

In another embodiment, the choice of the solvent in which the process is carried out may influence the surface, the particle or coating characteristics. In one embodiment, particle size, surface features, monolayer coating uniformity or monolayer coating density is affected by the choice of solvent, or by concentrations of solutes in the solvent, or concentration of particles present, or concentration of organic molecule used, or a combination thereof.

In one embodiment the temperature, reaction time, solution pH or additives included in the reaction mixture may influence surface characteristics, nanoparticle characteristics or monolayer characteristics as will be appreciated by one skilled in the art.

It will be appreciated that verification of surface characteristics or nanoparticle characteristics can be confirmed by any number of imaging or analysis techniques, known in the art, for example, and in one embodiment, by transmission electron microscopy (TEM), or in another embodiment by atomic force microscopy (AFM) or by STM, or in another embodiment, by contact angle measurements, or by particle detection or monitoring techniques including spectroscopy and ultrasound detection techniques or others, as will be known to the skilled artisan.

In one embodiment, a process of this invention further comprises a step of removal of the organic monolayer from the surfaces. In one embodiment removal of the organic monolayer is performed for the purpose of coating the surface with a different monolayer for recycling or reuse of the surfaces. According to this aspect of the invention and in one embodiment, the surface is coated with a new monolayer possessing a different reactive group for the catalysis of a different reaction. In one embodiment the organic layer is removed thermally. In one embodiment the organic layer is removed by oxidation. In one embodiment the organic layer is removed by oxidation in solution. In one embodiment the organic layer is removed after surfaces are dried. In one embodiment the organic layer is removed by etching the outermost layer or layers of the surface. In one embodiment the organic molecule is removed by chemical exchange.

In one embodiment the organic monolayer coating or specific organic monolayer domains in the coating or specific organic molecules in the coating are chemically modified. In one embodiment, modification is done, after the at least two organic molecules have assembled on the surface. In one embodiment the organic monolayer coating or molecules in it can be modified to contain a functional or a reactive group. In one embodiment the functional group is an imidazole. In one embodiment the functional group is an amine. In one embodiment the functional group is an OH group. In one embodiment the functional group is a reducing agent. In one embodiment the functional group is an oxidizing agent. In one embodiment the functional group is exposed to the surrounding. In one embodiment the functional group is used for further chemical synthesis. In one embodiment the functional group is used for catalysis. In one embodiment the reactive group is used for linking an organic molecule to the molecule forming the coating. In one embodiment a metal ion is linked to the organic molecule. In one embodiment synthesis or catalysis comprises linking an inorganic compound, a metal atom, a metal cluster, or a polymer to the organic monolayer forming the particle coating. In one embodiment synthesis comprises linking a biological molecule or a biological function to the organic monolayer coating the surface.

In one embodiment, additional material is physically adsorbed or deposited on top of the organic monolayer coating. In one embodiment, the additional material is a metal. In one embodiment the additional material is an inorganic compound. In one embodiment the additional material is an organic molecule. In one embodiment, the additional material is a polymer. In one embodiment encapsulation of the particle or coating of the surface by a polymer is done in order to isolate it from its surroundings. In one embodiment encapsulation/coating prevents aggregation of particles. In one embodiment encapsulation protects the surfaces/particles against undesired chemical reactions. In one embodiment, encapsulation/coating controls the rate of a catalyzed reaction. In one embodiment encapsulation of the particle protects the particle for safe delivery purposes. In one embodiment, once a particle or a cluster or a collection of particles or clusters reaches their target, encapsulation is removed. In one embodiment, such method is used for targeted catalysis. In one embodiment, such method is used for stabilization. In one embodiment, such method is used to increase the shelf-life of a surface or of a particle, cluster or a collection thereof.

In another embodiment, the additional material adsorbed on or coating the surface is biological. In another embodiment, the additional material adsorbed on or coating the surface is a drug or therapeutic agent. In one embodiment the material is a protein. In one embodiment the material is an enzyme or an enzyme mimetic molecule. In one embodiment the material is a peptide. In one embodiment the material is a receptor. In one embodiment the material can bind to a receptor. In one embodiment the material is an antibody or an antigen. In one embodiment the material enables the bonding of a particle to a cell, or bonding of a cell to a surface. In one embodiment bonding of particle to a cell (or a cell to a surface) induces catalysis of a reaction. In one embodiment the protein is fluorescent. In one embodiment, the biological material is a DNA, RNA, a nucleic acid or a nucleic acid sequence. In one embodiment the coated particle can pass through membrane channels. In one embodiment the additional material is adsorbed onto the surface from solution. In one embodiment adsorption involves covalent bonds. In one embodiment adsorption involves polar, ionic or van der Waals bonds. In one embodiment adsorption is reversible. In one embodiment adsorption/desorption of material is controlled thermally. In one embodiment adsorption/desorption of material is controlled by pH change, by the chemical nature of the molecules involved, the chemical environment and chemical concentration. In one embodiment the additional material is adsorbed from the gas phase. In one embodiment only part or a portion of the surface or of the particle is coated by the adsorbed material. In one embodiment at least two types of additional materials are adsorbed on the surface.

It will be clear to a person skilled in the art that processes described herein, wherein a material is added to a surface of this invention, may be utilized for surfaces wherein the first organic monolayer remains attached to the surface, or for surfaces wherein portions of the monolayer has been removed from the surface.

In one embodiment a process of this invention comprises preparing a solution containing ions which will be used to form the particles. In one embodiment the solution further comprises the organic molecules which will be used to coat the particles or the clusters. In one embodiment the solution comprises at least one organic molecule containing at least one functional end group. In one embodiment, one organic molecule is added first and the other one is added later to the solution. In one embodiment the solution is mixed or stirred. In one embodiment the interaction of organic molecules and particles occurs in the solution. In one embodiment the solution is heated. In one embodiment, the interaction between the organic molecules and the nanoparticles results in binding of the end group of the organic molecule to the particle. In one embodiment the "tail" of the molecule stretches away from the nanoparticles after the end group of the molecule is bound to the particle. In one embodiment the tail of the organic molecule is maintained in an extended configuration, with tails of neighboring molecules proximal thereto maintained in an extended configuration, as well. In one embodiment such stretched binding to a surface forms a mono-molecular layer of molecules on the nanoparticles. In one embodiment such monolayer formation is a spontaneous process. In one embodiment such monolayer formation is termed self-assembly.

In one embodiment, the self-assembly process as described herein above is applicable to surfaces other than the surfaces of particles. In one embodiment, the self-assembly process is applicable to any surface to which the molecules can bind.

In one embodiment the solvent used in processes of this invention is toluene. In one embodiment the solvent is benzene, ether or hexane. In one embodiment, the solvent is methanol, ethanol, acetonitrile, DMF, THF, methylene chloride or a mixture of two or more solvents. In one embodiment the organic solvent contains organic molecules dissolved in the solvent. In one embodiment the organic molecule comprises a carboxylic group. In one embodiment the organic molecule is Lauric (dodecanoic) acid. In one embodiment the organic molecule comprises a saturated or an unsaturated alkyl chain. In one embodiment the organic molecule comprises a thiol group. In one embodiment the organic molecule comprises a dithiol. In one embodiment the organic molecule comprises a disulfide group.

In one embodiment the organic molecule is rod-shaped. In one embodiment the organic molecule is branched. In one embodiment rod-shaped molecules enables a closed-packed organic monolayer to form on the surface. In one embodiment the rod like molecules has a length of between 0.6 nm and 2.4 nm. In one embodiment such length enables the best packing of the monolayer with fewer defects. In one embodiment such closed-pack array of rod-like molecules with exposed end-groups facilitates chemical reactions. In one embodiment branched molecules interfere with the packing of the monolayer. In one embodiment branched molecules can not make a high number of attractive intermolecular interactions with their neighboring molecules. In one embodiment having branched molecules in the monolayer results in more defects in the monolayer. In one embodiment such defects can make the surface permeable. In one embodiment such defects can result in contact between the surface and materials in the environment of the surface. In one embodiment such defects can result in contact between specific groups on the organic molecules and substrates or materials in the environment of the surface. In one embodiment, such defects may assist catalysis by reactive groups in the monolayer which were otherwise shielded from the surrounding.

In one embodiment, one of the at least two organic molecules represent the focal point of a dendrimer. In one embodiment, dendrimer molecules on the surface can be the basis of a multiple generation dendrimeric structure. In one embodiment the dendrimeric structure is used for catalysis. In one embodiment, having the reactive dendrimeric structures isolated from each other by a group of non-reactive monolayer-forming molecules, increase the reactivity of the dendrimeric molecules. In one embodiment, the reactivity of the dendrimeric groups is increased because they are better exposed to the environment when surrounded by shorter or longer, non-reactive monolayer-forming molecules. In one embodiment the two or more organic molecules are dissolved in a solvent.

In one embodiment the organic molecule solution used has an organic molecule concentration ranging between 0.005 M and 0.015 M. In one embodiment, the organic molecule solution used has an organic molecule concentration ranging between 0.01 M and 0.02 M. In one embodiment the concentration of at least one of the organic molecules is ranging between 0.01 M and 0.05 M. In one embodiment the concentration of at least one organic molecule is ranging between 0.05 M and 0.1 M. In one embodiment, the concentration of at least one organic molecule is between 0.5 M and 1.0 M. In one embodiment the concentration ratio of the at least two organic molecules is between 1/1 and 1/10. In one embodiment the concentration ratio of the at least two organic molecules is between 1/1 and 1/3. In one embodiment the concentration ratio between the two organic molecules is between 1/10 and 1/100.

In one embodiment, one solution contains one organic molecule and another solution contains a second organic molecule. In one embodiment one solution contain at least two organic molecules. In one embodiment, one organic molecule is introduced to the particle solution or to the surface first, and the second organic molecule is introduced second. In one embodiment a third organic molecule is introduced. In one embodiment, organic molecules of one type can replace organic molecules of a second type already coating the surfaces. In one embodiment, molecule replacement is a function of the concentration of the new molecule introduced. In one embodiment, the extent of molecule replacement is a function of time. In one embodiment, the extent of molecule replacement is a function of temperature. In one embodiment, molecule replacement is used to control density, concentration, domain size, or pattern characteristics of the two or more organic molecules forming the surface coating.

In one embodiment, particle collection is accomplished by drying. In one embodiment, particle collection is conducted by evaporation of the solution. In one embodiment collection is done by precipitation of particles from the solution. In one embodiment particle collection is accomplished by separating the particles from the solution. In one embodiment the solution is separated from the precipitated particles by pouring, rinsing or filtering. In one embodiment particles are kept in solution for further use. In one embodiment, keeping particles in solution prevents or inhibits aggregation. In one embodiment, keeping particles in solution increases the stability of the particles. In one embodiment, keeping particles in solution renders the particles ready-to-use for various applications. In one embodiment, one such application is catalysis.

In one embodiment, surfaces of this invention are brought into contact with a solution containing two types of molecules. In one embodiment, the two types of molecules contain a thiol group at one end. In one embodiment, one of the two types of molecules contains a functional group as well. In one embodiment, the functional group can serve as a catalyst. In one embodiment, when the molecules of the two types approach the surface in solution, the molecules will adhere to the surface through the thiol bond. In one embodiment, molecules of the inert type will bind to the surface in close proximity. Such binding, in one embodiment, will exclude the catalyst-containing molecules to other areas. In one embodiment, as a result, segregation occurs, and areas or lines including inert molecules only or catalyst molecules only will form on the surface. The isolation of the catalyst molecules may enhance their catalytic properties in one embodiment. The surroundings of the catalyst molecules may enhance their catalytic activity in another embodiment. The steric configuration of the catalytic group and its surrounding may enhance their catalytic activity in one embodiment. The orientation of the molecule possessing the catalytic group which may be dictated by the surrounding inert molecules may enhance catalytic activity of the functional groups. The combination of chemical properties, orientation, geometry and variation in length between the catalyst molecule and the inert molecule, may enhance the catalytic activity of the molecules in one embodiment. The catalyst molecules and inert molecules may be of equal or approximately the same length, or maybe of different length.

The processes of the invention yield surfaces, nanoparticles and clusters, in which any embodiment thereof as herein described may be obtained by such processes, as will be appreciated by one skilled in the art.

III. Compositions/Kits Comprising the Surfaces, Particles, Clusters of the Invention In one embodiment this invention provides a composition comprising the surface or the nanoparticles of this invention. In one embodiment, such composition may be utilized for multiple applications, for example, for delivery of a compound of interest. In one embodiment the composition further comprises a carrier, diluent, lubricant, flow-aid, or a mixture thereof. In one embodiment the composition is in the form of a pellet, a tablet, a capsule, a solution, a suspension, a dispersion, an emulsion, an elixir, a gel, an ointment, a cream, or a suppository. In one embodiment the composition is employed for a non-therapeutic purpose, for example, for catalysis of reactions or separation of chemicals from oil and gas mixtures or products, from water, soil, air or in other environmental applications.

In one embodiment the composition is administered to a subject. In one embodiment the composition is in a form suitable for oral, intravenous, intraarterial, intramuscular, intracranial, intranasal, subcutaneous, parenteral, transmucosal, transdermal, or topical administration. In one embodiment the composition is a controlled release composition. In one embodiment the composition is an immediate release composition. In one embodiment the composition is a liquid dosage form. In one embodiment the composition is a solid dosage form. In one embodiment the composition further comprises an antibiotic compound, an antineoplastic compound, an immunotherapeutic agent or another drug. In one embodiment the composition further comprises a pH indicator. In one embodiment the pH indicator is a molecule. In one embodiment the pH indicator is congo red.

In one embodiment, this invention provides a pharmaceutical composition comprising the nanoparticles/clusters of this invention. In one embodiment the nanoparticles composition comprises a targeted drug delivery composition. In one embodiment the nanoparticles contain a drug. In one embodiment the nanoparticles contain a cell binding function and a drug. In one embodiment the composition further comprises a carrier, diluent, lubricant, flow-aid, or a mixture thereof. In one embodiment the composition is in the form of a pellet, a tablet, a capsule, a solution, a suspension, a dispersion, an emulsion, an elixir, a gel, an ointment, a cream, or a suppository. In one embodiment the composition is in a form suitable for oral, intravenous, intraarterial, intramuscular, intracranial, intranasal, subcutaneous, parenteral, transmucosal, transdermal, or topical administration. In one embodiment the composition is a liquid dosage form. In one embodiment the composition is a solid dosage form. In one embodiment the composition further comprises an antibiotic compound, an antineoplastic compound, an immunotherapeutic agent or another drug.

In one embodiment this invention provides a tissue engineering kit comprising the nanoparticles/clusters of this invention. In one embodiment the kit comprises:
- a porous complex structure of nanoparticles or clusters;
- a cell source; and at least one, or combinations of the following components:
- a composition comprising drugs or biological functions for enhancing properties such as biocompatibility, cell growth, immune system functions;
- chemicals and drugs such as antibiotics, cell nutrients, oxygen, water;
- cell markers, nanoparticle markers, markers for drugs or for biological functions.
- reagents to remove or degrade or decompose nanoparticles structure once cell tissue is self-sustained, or during tissue growth;
- a substrate, a vessel, a dish, a vial, a biological tissue, to support porous nanoparticles structure; and
- a carrier, diluent, lubricant, flow-aid, or a mixture thereof.

In one embodiment, in a tissue engineering kit of this invention, the nanoparticle/cluster structures exhibit enhanced binding affinity to cells or biological functions of interest, thus increasing biocompatibility of the nanoparticle structure. In one embodiment, the ability to control the concentration and accessibility of active binding sites on the particles, by controlling the morphology or the domain structure of the mixed monolayer surrounding the particles, facilitates tissue engineering based on the nanoparticle/cluster structure.

In one embodiment, this invention provides a kit for catalysis or for separation of chemicals comprising the surfaces, or the nanoparticles/clusters of this invention. In one embodiment the kit comprises:
- A permeable structure of the surfaces or a porous structure of the nanoparticles or clusters of this invention;
- a container comprising an inlet and an outlet such as a column, a tank, a cylinder, a pipe, a vessel in which the permeable structure of the surfaces or the porous complex structure of nanoparticles or clusters is packed; and
- a mean for introducing and dispensing a solution or a phase to and from the container.

In one embodiment, the catalysis or separation kit comprising surfaces or nanoparticles of the invention, further comprises reagents. In one embodiment, the catalysis or separation kit further comprises solvents. In one embodiment, the catalysis or separation kit further comprises a pump. In one embodiment, the catalysis or separation kit further comprises a syringe. In one embodiment, the catalysis or separation kit further comprises a collection chamber. In one embodiment, the catalysis or separation kit further comprises a detection system. In one embodiment, the catalysis or separation kit further comprises a filter. In one embodiment, the kit can be connected to a computer. In one embodiment, the kit is compatible with automated systems.

In one embodiment, nanoparticles and clusters of this invention are supported on a substrate. In one embodiment, nanoparticles of the invention are supported within the pores of a porous material. In one embodiment, nanoparticles of this invention are packed into a column or a vessel. In one embodiment, nanoparticles of this invention, are used in solution. In one embodiment, nanoparticles of this invention are colloids. In one embodiment, nanoparticles of this invention are used in the form of a suspension, a colloidal solution, a dispersion, a two phase system, or as a layer floating on a surface of a solution. In one embodiment, the nanoparticles precipitate to the bottom of a solution, and are used in this way.

IV. Methods of Use of the Surfaces, Nanoparticles and Clusters of this Invention In one embodiment, this invention provides a method of reaction catalysis comprising:
- contacting a reactant with a surface comprising a catalyst attached thereto, wherein said catalyst is confined in regions of 0.5 nm to 3 nm in size and is surrounded by an inert material;
- wherein said contacting results in catalysis of a reaction involving said reactant.

In one embodiment, the catalyst is organic. In one embodiment, the catalyst is inorganic. In one embodiment, the inert material is organic. In one embodiment, the inert material is inorganic.

In one embodiment, the organic catalyst is a portion of a larger organic molecule. In one embodiment, the organic catalyst forms self-assembled monolayers on the surface.

In one embodiment, the organic catalyst comprises thiols. In one embodiment, the thiol is 10-mercaptodecane-1N-imidazole (IT).

In one embodiment, the inert material comprises a thiol-terminated molecule. In one embodiment, the thiol-terminated molecule is 1-octanethiol (OT), 1-hexadecanethiol (HD), or a combination thereof.

In one embodiment the ratio between the organic catalyst and the inert material is about HT:IT 1:1, OT:IT 1:2 or OT:IT 1:3.

In one embodiment, the surface is the surface of a nanoparticle. In one embodiment, the surface comprises metal. In one embodiment, the surface comprises gold.

In one embodiment, the confined region is ordered. In one embodiment, the ordered confined region is 1-10 molecules wide.

In one embodiment, the reaction is a chemical reaction.

In one embodiment, the reaction is a hydrolysis reaction.

In one embodiment, the substrate for the reaction catalysis is 2,4-dinitrophenyl acetate. In one embodiment, the reaction rate of the reaction that is catalyzed by a surface or a particle or a cluster covered by at least two molecules is 2-4 times faster than the rate of a reaction that is catalyzed by a particle coated by a single molecule. In one embodiment, the catalyzed reaction is a hydrolysis reaction.

In one embodiment, the term "catalysis" refers to the process in which the rate of a chemical reaction or a biological process is increased by a catalyst. In one embodiment, a catalyst is an agent that increases the rate of a chemical reaction. In one embodiment, a catalyst is an atom, a molecule, an ion, a radical, a surface, an aggregate of molecules, a monolayer, a multilayer, a cluster of atoms, a particle, a cluster of particles, a nanoparticle, a microparticle, a polymer, a dendrimer, a macromolecule, a biomolecules, a protein, an enzyme, a ribozyme or any other substance that increase the rate of a chemical reaction.

In one embodiment, the catalyst increases the rate of a chemical reaction. In one embodiment, the catalyst reduces the activation energy of a reaction. In one embodiment, by reducing the activation energy of the reaction, a much greater fraction of the collisions between reacting species is effective. In one embodiment, effective collision is a collision involving a reactant molecule that leads to a reaction and to the formation of products.

In one embodiment, catalysis enables to increase a reaction rate without the need to increase the temperature of the reaction. In one embodiment, a catalyst acts on the reactant species. In one embodiment, the catalyst weakens bonds within a reactant molecule. In one embodiment, the catalyst breaks bonds within a reacting molecule. In one embodiment, a catalyst arranges the reactant in a configuration that facilitates a reaction. In one embodiment, the catalyst activates the reactant. In one embodiment, the catalyst helps in the migration of the reactants. In one embodiment, the catalysts bring reactants to a close proximity. In one embodiment, the catalyst binds to one or more of the reactants. In one embodiment, the catalyst changes the polarity of the reactant. In one embodiment, the catalyst changes the electron configuration of the reactant. In one embodiment, the catalyst changes the energy state of the reactant.

In one embodiment, the rate of a reaction is characterized by the rate constant k for the reaction. In one embodiment, the rate constant k is a function of the temperature T, a function of the prefactor A and a function of the activation energy Ea. In one embodiment, the Arrhenius equation describes the relationship between k, T, Ea and A as follows: $k=A*\exp-Ea/RT$, wherein R represents the gas constant. The prefactor A, sometimes called the frequency factor is comprised of two components z and p. z is the collision frequency and p is called the steric factor. p (always less than 1) reflects the fraction of collisions with effective orientations, and $\exp-Ea/RT$ represents the fraction of collisions with sufficient energy to produce a reaction. The prefactor A is the product of z and p: $A=z*p$.

In one embodiment catalysts of the present invention increase the reaction rate by affecting the value of the prefactor A. In one embodiment, catalysts of this invention affect the value of A by affecting the value of the steric factor p. In one embodiment, the value of p can be increased by increasing the fraction of collisions with effective orientations. In one embodiment, when the catalyst is confined to a nanoscale region, it can be oriented with respect to the reactant in such a way that the reactant obtains an effective orientation toward a reaction. In one embodiment, having the catalyst surrounded by inert material increases the catalyst cross section available for reacting with the reactant. In one embodiment, the combination of a catalyst and an inert material in regions with molecular dimensions, results in preferred reactant orientation, that increases the reaction probability.

In one embodiment, the catalyst is confined to a nanoscale region. In one embodiment, a catalyst that is confined in a nanoscale domain regulates the way the reactant molecules are presented to the catalyst and hence control the prefactor A in the expression of the catalytic rate ($k=A*\exp-Ea/RT$). In one embodiment, a catalyst that is confined in a nanoscale domain improves the way the reactant molecules are presented to, or are attached to the catalyst. In one embodiment, the inert material regulates the way the reactant molecules approach the catalyst. In one embodiment, a portion of the reactant binds to the catalyst, and a portion of the reactant binds to the inert material, thus improving orientation of the reactant, and improving reaction rate.

In one embodiment, a catalyst generates an intermediate species. In one embodiment, the intermediate species is a molecule. In one embodiment, the intermediate species is a molecule adsorbed or bound to a surface. In one embodiment, the intermediate further reacts to yield another intermediate. In one embodiment, the intermediate further reacts to form a product of the reaction.

In one embodiment, a catalyst is a substance that speeds up the reaction without being consumed.

In one embodiment, catalysis is heterogeneous. In one embodiment, heterogeneous catalysis involves gaseous reactants being adsorbed on the surface of a solid catalyst. In one embodiment, heterogeneous catalysis involves reactants in solution being adsorbed on the surface of a solid catalyst. In one embodiment, heterogeneous catalysis involves two phases. In one embodiment, the catalyst is present in one phase and the reactant in another phase.

In one embodiment, catalysis is homogeneous. In one embodiment, a catalyst in a homogeneous catalysis exists in the same phase as the reacting molecules. In one embodiment, both the reactant and the catalyst exist in the gas phase.

In one embodiment, the reactant in a catalyzed reaction is termed a "substrate". Biological molecules that participate in biological processes that are catalyzed by an enzyme, are usually referred to as "substrates". In one embodiment, the reactant is a substrate for the action of the catalyst. In one embodiment "substrate" is synonymous with "reactant" when reference is made to catalytic reactions.

In one embodiment, the surfaces, nanoparticles and clusters of this invention are used to catalyze chemical reactions. In one embodiment, the chemical reaction is part of a biological process. In one embodiment, the chemical reaction is carried out in vivo. In one embodiment, the chemical reaction is an industrial reaction.

In one embodiment, the chemical reaction is hydrolysis. In one embodiment, the hydrolysis reaction is the hydrolysis of an amide. In one embodiment, the hydrolysis is of an ester. In one embodiment, the hydrolysis is of a disaccharide or a polysaccharide. In one embodiment, the chemical reaction is hydrogenation. In one embodiment, the chemical reaction is halogenation, esterification, dehydrogenation, condensation, a reaction involving substitution or addition of a functional group, a reaction involving cleavage of a biomolecules, or a reaction involving the construction of a biomolecule. In one embodiment, the catalyzed reaction is any chemical reaction known to a person skilled in the art.

In one embodiment, surfaces of the invention are used in separation methods. In one embodiment, the surfaces comprise active molecules or atoms or clusters that are confined to a small (1 nm-3 nm) area and are surrounded by an inert material. In one embodiment, the orientation of the active molecules and the inert material on surfaces of this invention, facilitate their association with molecules in a solution or a gaseous phase surrounding the surfaces. In one embodiment, such preferred interaction results in enhanced separation of molecules or ions from a solution or a gas phase. In one embodiment, the preferred association of the surfaces of this invention with specific molecules renders them useful in separation techniques such as chromatography. In one embodiment, chromatography is a liquid or a gas chromatography. In one embodiment, chromatography is a thin-layer chromatography. In one embodiment, surfaces of this invention are used in electrophoresis and in high performance separation techniques.

In one embodiment, surfaces of this invention are used as filters or membranes. In one embodiment, the enhanced binding of species from solution or from a gas phase to surfaces of this invention, trap the species within a filter or a membrane constructed from surfaces of this invention.

In one embodiment, the surfaces of this invention are used for purification and for chemical detection. In one embodiment, surfaces of the invention trap and retain chemicals as described herein above. In one embodiment, chemical purification is for the purpose of reducing contaminants. In one embodiment, purification is done on water, air, soil, food and cosmetic products. In one embodiment, surfaces of this invention find applications in environmental methods.

In one embodiment, surfaces of this invention are used for chemical detection of a contaminant. In one embodiment, surfaces of this invention are used for chemical detection of a poisonous material. In one embodiment, surfaces of this invention are used for the detection of explosives, hazardous materials, herbicides, insecticides, metals, gas molecules, and materials in small concentrations.

In one embodiment, trapped species can be detected on the surface or after releasing from the surface. In one embodiment, species can be detected using spectroscopy.

In some embodiments the surfaces or nanoparticles preparations of this invention may be used as scaffolds in tissue engineering. In tissue engineering, cells are often implanted or 'seeded' into an artificial structure capable of supporting three dimensional tissue formation. These structures, typically called scaffolds, are often critical, both ex vivo as well as in vivo, to recapitulating the in vivo milieu and allowing cells to influence their own microenvironments. Scaffolds may be useful for at least one of the following purposes:

Allowing cell attachment and migration
Delivering and retaining cells and biochemical factors
Enabling diffusion of vital cell nutrients and expressed products
Exerting certain mechanical and biological influences to modify the behavior of the cell phase;
Or combinations thereof.

Porous materials are among the numerous candidates for tissue engineering scaffolds since they can be biocompatible, resistant to biodegradation, non-toxic and can be functionalized with biomolecules.

To achieve the goal of tissue reconstruction, scaffolds must meet some specific requirements. A high porosity and an adequate pore size are necessary to facilitate cell seeding and diffusion throughout the whole structure of both cells and nutrients. Biodegradability is often an essential factor since scaffolds should preferably be absorbed by the surrounding tissues without the necessity of a surgical removal. The rate at which degradation occurs has to coincide as much as possible with the rate of tissue formation: this means that while cells are fabricating their own natural matrix structure around themselves, the scaffold is able to provide structural integrity within the body and eventually it will break down leaving the neotissue, newly formed tissue which will take over the mechanical load. Injectability is also important for clinical uses.

In some embodiments, surfaces or nanoparticles or complex nanoparticle-organic structures of this invention can be used as scaffolds onto which cells will adhere and tissue will grow. In some embodiments, surfaces or nanoparticles can be dissolved or degrade after cell tissue is completed. In some embodiments surfaces or nanoparticles can degrade slowly over a period of time necessary for the tissue build up. In some embodiments the surfaces or the nanoparticles can decrease in size over time, allowing controlled growth of the tissue into the newly formed spaces.

The scaffold may be useful in bone/cartilage regeneration applications, in muscle tissue engineering or in angiogenesis, or any other appropriate application for tissue growth, repair and/or regeneration. The scaffolds may be seeded with stem and/or progenitor cells to facilitate tissue reconstruction. In one embodiment, the organic linker between neighboring surfaces or particles will be chosen with a length that will dictate pore size or distance between particles or surfaces, and the size and morphology of the growing tissue. In some embodiments, other materials of interest may be incorporated in the scaffold, such as tissue growth promoting factors, bone morphogenic proteins or materials for bone reconstruction applications.

In one embodiment nanoparticles of the present invention can be used as drug delivery vehicles, wherein, the drug molecule of choice is bonded by intermolecular forces to the particle or to the particle coating. In some embodiments the particles are targeted to the location where the drug is required. In one embodiment drug action takes place while drug molecules are bounded to the particles. In one embodiment drug action takes place after drug is being released form the particle. In one embodiment, ordered domains of coating molecules can enhance binding of the nanoparticle to the target, to a drug, to a targeting moiety, a marker or a cell receptor.

In one embodiment the drug molecule binds to the particle through covalent bonds and in other embodiment by polar bonds. In one embodiment the molecule is bounded to the particle by making van der Waals bonds with surface atoms of the particle or particle coating. In one embodiment the drug molecule is first conjugated to a molecule that posses a functional group that can bind the particle or the coating molecules. In one embodiment the drug molecule contains at least one COOH group that can bind to the particle or to the particle coating. In one embodiment the drug molecule is the coating molecule of the particle. In one embodiment the drug molecule is one of two molecules forming the organic-layer coating of the particle. In one embodiment the drug molecule is bonded to the particle after the coating is applied, and in another embodiment the drug molecule is bonded to the particle before or during the period in which the organic coating of the particle is applied. In one embodiment the drug molecule is bonded to the particle through a linker molecule that can be cleaved using a cleaving agent. In one embodiment cleaving takes place once the particles have reached their target. In one embodiment cleavage of drug molecules is performed using a chemical. In one embodiment the cleavage is performed using electromagnetic radiation.

In one embodiment, in addition to the drug molecule, a functional group is attached to the particle such that the functional group can bind the particle to a cell or to a cell membrane. In one embodiment the function is recognized by membrane or by other cell receptors. In one embodiment the functional group contains a membrane-spanning portion.

In one embodiment a marker molecule is bounded to the molecule in addition to the drug molecule. In one embodiment the marker is a fluorescent marker. In one embodiment the marker is used to confirm the location of the particles carrying the drug, so that drug release processes can be initiated. In one embodiment the confirmation is a non-invasive confirmation. In one embodiment a core-shell particle of this invention is used. In one embodiment the core-shell particle containing a drug molecule is targeted to a location where the drug is required. In one embodiment, non-invasive opto-thermal heating of the particle releases the drug molecule from the particles. In one embodiment opto-thermal heating of the particle, induces the right conditions for the activity of the drug. In one embodiment the drug-containing particles of this invention are formulated for oral (through the mouth), nasal, aerosol (inhalation), and rectal administration. In one embodiment the particles are delivered by injection. In one embodiment the release rate of the drug molecule from the particle depends on the density of the coating. In one embodiment the release rate of the drug molecule from the particle depends on the strength of the chemical bond between the drug and the particle or the coating. In one embodiment the release rate of the drug molecule depends on natural or induced chemical or physical conditions of the environment of the particles. In one embodiment the release rate of the drug is slow. In one embodiment the release rate of the drug is over the course of days, weeks or month.

In one embodiment the nanoparticles of this invention are used for optothermal targeted cancer diagnosis and therapy. In one embodiment the nanoparticles of this invention are coated with a metal layer. In one embodiment this layer and the nanoparticles are considered nanoshells. In one embodiment the nanoshells of this invention are administered to a subject. In one embodiment the nanoshells bind to tumors or cancerous cells. In one embodiment a near-infrared radiation is briefly applied over the subject's body. In one embodiment radiation scattered from the tumor-bound nanoshells, locates the tumors. In one embodiment, once located, each tumor is hit with the same radiation, at higher intensities, killing the tumor, without damaging the surrounding tissues. In other embodiments, the particles and arrays of this invention may be applied as described in U.S. Pat. No. 6,645,517, fully incorporated by reference herein.

In one embodiment, the metal shell of the nanoparticle absorbs the externally applied light energy, turning it into heat. In one embodiment the temperature of the nanoshells reaches up to 131 degrees F. In one embodiment excessive heating destroy or kill cells adjacent to the nanoshells. In one embodiment such therapy enables a single-visit diagnosis and treatment, and significantly less damage to non-cancerous tissues. In one embodiment such treatment provides high precision treatment. In one embodiment, after diagnosis and treatment, nanoshells are naturally eliminated from the body.

In one embodiment, surfaces or the nanoparticles of this invention are useful in the construction of membranes or filters. In one embodiment, packing the surfaces or nanoparticles of this invention into a column yields a porous material that can pass liquid and retain particles, molecules or ions. In one embodiment the chemical nature of the surface coating or of the particle coating dictates the retention properties of the column containing the nanoparticles. In one embodiment the chemical nature of the surface/particle coating dictates the reaction rate of chemicals with the column containing the surface or the nanoparticles.

In one embodiment linking the surfaces or the nanoparticles with organic molecules result in a complex structure with pore sizes or distances that reflect the length and the density of the organic molecules linking the surfaces or the particles. In one embodiment the complex structure serves as a filter. In one embodiment a liquid solution is passed through the filter. In one embodiment a gaseous mixture is passed through the filter. In one embodiment a gas dissolved in a liquid is passed through the filter. In one embodiment the organic linkers between the surfaces or the particles are functionalized. In one embodiment the organic linkers are polar. In one embodiment the organic linker are non-polar. In one embodiment the organic linkers contain receptors for biological molecules. In one embodiment retention of biological molecules by the complex organic-nanoparticle complex is a method for analyzing a biological sample.

In one embodiment, the term "a" or "one" or "an" refers to at least one. In one embodiment the phrase "two or more" may be of any denomination, which will suit a particular purpose. In one embodiment, "about" or "approximately" may comprise a deviance from the indicated term of +1%, or in some embodiments, −1%, or in some embodiments, ±2.5%, or in some embodiments, ±5%, or in some embodiments, ±7.5%, or in some embodiments, ±10%, or in some embodiments, ±15%, or in some embodiments, ±20%, or in some embodiments, ±25%.

In some embodiments surfaces or particles or clusters of this invention may be used for enforcing a material. In one embodiment, surfaces, particles or clusters of this invention may be used for coating or filling a material. In one embodiment, surfaces or particles or clusters of this invention may be used in mixtures containing other materials. In one embodiment, surfaces/particles/clusters of this invention may be used in products such as metal, wood, paper, polymers, ink and paint. In one embodiment, surfaces/particles/clusters of this invention may be used with compositions containing herbicides or insecticides or precursors thereof. In one embodiment, surfaces/particles/clusters of this invention may be used with compositions containing explosives or precursors thereof.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

EXAMPLES

Example 1

Synthesis and Catalytic Activity of Ordered Shell Monolayer Coated Gold Nanoparticles Monolayer protected nanoparticles that are capable of catalyzing organic reactions were developed. The catalytic activity of the monolayer coated nanoparticles is the result of the unique surface morphology of their monolayer shell. The ordering of molecules in the particle shell generates a nanoscale surface on which organic reactions can be enhanced or suppressed by altering the shell morphology.

Monolayer coated nanoparticles were created by arresting the growth of metallic crystals with long, usually hydrocarbon type molecules. The molecules possess reactive groups at their tails which bind to the metal surface and prevent aggregation and aide solubility. The layer of molecules around the metal crystal may be called a shell. When monolayer coated nanoparticles are synthesized with two, appropriately chosen molecules, the molecules can self-assembly into ordered patterns in the shell. Depending on the ratio of the two ligands, the morphology of this pattern can be tuned from a disordered mixed phase, to isolated domains and circumferential bands (ripples). The morphology can be adjusted by changing the molecule ratio in the synthesis of the particles.

If the molecules are chosen to possess reactive moieties at their exposed ends, then the molecular shell of the monolayer coated nanoparticles can become a catalytic surface for organic reactions. It was demonstrated that certain monolayer-coated nanoparticle systems containing molecules with organic functional groups, catalyze organic reactions in aqueous solutions. By tuning the molecule ratio within the monolayer, and hence the morphology of the monolayer shell, the reaction rate was enhanced. Molecule geometries were selected in order to produce grooves or ridges on the monolayer surface on which catalysis can take place, providing the ability to assemble unique catalytic sites on the surface of the particles.

Both these effects have been demonstrated using a model system of gold nanoparticle coated with 11-(1N-1-imidazol-1-yl)undecane-1-thiol (IT) in combination with 1-octanethiol (OT) or 1-hexadecanethiol (HD) (FIG. 1). All ligands possess thiol groups which coordinate with the gold crystal surface. IT ligands possess an imidazole moiety, a well known general acid-base organic catalyst in biology and chemistry. This catalyst was used to accelerate the hydrolysis of a substrate, 2,4-dinitro-phenylacetate. The reaction was monitored spectroscopically.

It was found that when the ratio of IT to OT or HD was varied, the monolayer coated nanoparticles showed varying catalytic enhance. Monolayer coated nanoparticles made of mixtures of ligands showed greater enhancement of catalysis over a nanoparticle coated simply by the IT catalyst. The mixed ligand systems, with their assembled ripple morphology, demonstrated that order in the ligand shell can improve the catalytic rate. The all-catalyst (homogeneous monolayer) coated nanoparticle (labeled IT) had a lower rate constant than the ordered-shell, mixed monolayer OT:IT 1:2 nanoparticle and the HD:IT 1:1 nanoparticle (FIG. 1).

What is claimed is:

1. A method of catalyzing a chemical reaction comprising: contacting a reactant with a surface comprising a catalyst for catalyzing said chemical reaction attached thereto, wherein said catalyst is confined to regions of 0.5 nm to 3 nm in size and is surrounded by an inert material; and catalyzing the chemical reaction involving said reactant, wherein said surface exhibits enhanced catalytic activities of said catalyst for catalyzing said chemical reaction.

2. The method of claim 1, wherein said catalyst is organic.

3. The method of claim 1, wherein said catalyst is inorganic.

4. The method of claim 1, wherein said inert material is organic.

5. The method of claim 1, wherein said inert material is inorganic.

6. The method of claim 2, wherein said organic catalyst is a portion of a larger organic molecule.

7. The method of claim 2, wherein said organic catalyst forms self-assembled monolayers on said surface.

8. The method of claim 2, wherein said organic catalyst comprises thiols.

9. The method of claim 8, wherein said thiol is 10-mercaptodecane-1N-imidazole (IT).

10. The method of claim 4, wherein said inert material comprises a thiol terminated molecule.

11. The method of claim 10, wherein said thiol is 1-octanethiol (OT), 1-hexadecanethiol (HD), or a combination thereof.

12. The method of claim 9 or 10, wherein the ratio of said organic catalyst to said inert material is about HT:IT 1:1, OT:IT 1:2 or OT:IT 1:3.

13. The method of claim 1, wherein said surface is the surface of a nanoparticle.

14. The method of claim 13, wherein said nanoparticle comprises metal.

15. The method of claim 14, wherein said metal comprises gold.

16. The method of claim 1, wherein said confined region is ordered.

17. The method of claim 16, wherein said ordered confined region is 1-10 molecules wide.

18. The method of claim 1, wherein said reactant is 2,4-dinitrophenyl acetate.

19. The method of claim 1, wherein the reaction rate is 2-4 times faster than the rate of a reaction catalyzed by a non-confined catalyst.

20. The method of claim 1, wherein said reaction is a hydrolysis reaction.

* * * * *